(12) United States Patent
Kuwabara et al.

(10) Patent No.: US 10,354,131 B2
(45) Date of Patent: Jul. 16, 2019

(54) PRODUCT INFORMATION OUTPUTTING METHOD, CONTROL DEVICE, AND COMPUTER-READABLE RECORDING MEDIUM

(71) Applicant: FUJITSU LIMITED, Kawasaki-shi, Kanagawa (JP)

(72) Inventors: Shohei Kuwabara, Itabashi (JP); Fumito Ito, Kita (JP); Sayaka Suwa, Itabashi (JP); Naoki Kaneda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 15/347,989

(22) Filed: Nov. 10, 2016

(65) Prior Publication Data

US 2017/0061204 A1    Mar. 2, 2017

Related U.S. Application Data

(63) Continuation of application No. PCT/JP2014/062635, filed on May 12, 2014.

(51) Int. Cl.
*G06K 9/00* (2006.01)
*G06Q 30/02* (2012.01)
(Continued)

(52) U.S. Cl.
CPC ......... *G06K 9/00375* (2013.01); *G06F 3/017* (2013.01); *G06K 9/00771* (2013.01);
(Continued)

(58) Field of Classification Search
None
See application file for complete search history.

(56) References Cited

U.S. PATENT DOCUMENTS 8,873,794 B2 * 10/2014 Sorensen ........... G06K 9/00771
382/100
9,317,134 B2 * 4/2016 Clarkson ................. G06F 3/017
(Continued)

FOREIGN PATENT DOCUMENTS

JP    2001-128814    5/2001
JP    2004-171240    6/2004
(Continued)

OTHER PUBLICATIONS

Masanori Yokoyama et al., "A Method of Customer Decision Support in Mixed Environment of Goods and Displays", Jul. 2013, vol. 54 No. 7, pp. 1978-1987.
(Continued)

*Primary Examiner* — Samah A Beg
(74) *Attorney, Agent, or Firm* — Staas & Hasley LLP

(57) ABSTRACT

A product information outputting method includes: detecting that a hand of a person is present in a first area that is set according to a position of a product; and when the hand of the person is not detected in any one of the first area and a second area and the product is not detected in a product detection area after presence of the hand was detected based on the detecting, determining that the product has been moved out of the product detection area, the second area containing the first area, the product detection area set according to the position.

6 Claims, 10 Drawing Sheets

(51) Int. Cl.
  *G06Q 30/06* (2012.01)
  *G06K 9/78* (2006.01)
  *H04N 9/31* (2006.01)
  *G06F 3/01* (2006.01)

(52) U.S. Cl.
  CPC .............. *G06K 9/78* (2013.01); *G06Q 30/02* (2013.01); *G06Q 30/0261* (2013.01); *G06Q 30/06* (2013.01); *H04N 9/31* (2013.01); *H04N 9/3179* (2013.01); *H04N 9/3194* (2013.01)

(56) References Cited

U.S. PATENT DOCUMENTS

| | | | | |
|---|---|---|---|---|
| 9,563,906 B2* | 2/2017 | Stark | .................. | G06Q 30/0281 |
| 9,756,265 B2* | 9/2017 | Kuboyama | .......... | H04N 5/3355 |
| 9,916,614 B2* | 3/2018 | Otani | .................. | G06Q 30/0631 |
| 2002/0041327 A1* | 4/2002 | Hildreth | .................. | G06F 3/011 |
| | | | | 348/42 |
| 2003/0098910 A1* | 5/2003 | Kim | .................. | G06Q 20/20 |
| | | | | 348/150 |
| 2005/0162515 A1* | 7/2005 | Venetianer | .......... | G06F 17/3079 |
| | | | | 348/143 |
| 2006/0243798 A1* | 11/2006 | Kundu | .................. | G06Q 20/00 |
| | | | | 235/383 |
| 2008/0077510 A1* | 3/2008 | Dielemans | .......... | G06Q 10/087 |
| | | | | 705/28 |
| 2008/0172781 A1* | 7/2008 | Popowich | ............. | G06Q 30/02 |
| | | | | 4/476 |
| 2009/0052741 A1* | 2/2009 | Abe | .................. | G06T 7/223 |
| | | | | 382/103 |
| 2009/0135013 A1* | 5/2009 | Kushida | .................. | G06Q 10/08 |
| | | | | 340/568.1 |
| 2010/0332182 A1* | 12/2010 | Yatsuda | .................. | G01S 5/163 |
| | | | | 702/152 |
| 2011/0251903 A1* | 10/2011 | Ryu | .................. | G06Q 30/00 |
| | | | | 705/14.73 |
| 2011/0288938 A1* | 11/2011 | Cook | .................. | G06Q 30/0251 |
| | | | | 705/14.66 |
| 2012/0043375 A1* | 2/2012 | Ueda | .................. | G01G 19/4144 |
| | | | | 235/3 |
| 2012/0176398 A1* | 7/2012 | Takaoka | ............. | G06F 3/04883 |
| | | | | 345/589 |
| 2012/0206449 A1* | 8/2012 | Stark | .................. | G06Q 30/0281 |
| | | | | 345/419 |
| 2013/0290139 A1* | 10/2013 | Stark | .................. | G06T 13/40 |
| | | | | 705/26.61 |
| 2013/0330006 A1* | 12/2013 | Kuboyama | .......... | G06K 9/3241 |
| | | | | 382/190 |
| 2014/0067573 A1* | 3/2014 | Naito | .................. | G06Q 20/208 |
| | | | | 705/23 |
| 2014/0347479 A1* | 11/2014 | Givon | .................. | G06K 9/00342 |
| | | | | 348/143 |
| 2014/0369564 A1* | 12/2014 | Chono | .................. | A61B 6/469 |
| | | | | 382/103 |
| 2015/0088641 A1* | 3/2015 | Aoki | .................. | G06Q 30/0251 |
| | | | | 705/14.49 |
| 2015/0154449 A1* | 6/2015 | Ito | .................. | G06K 9/00375 |
| | | | | 382/103 |
| 2015/0184997 A1* | 7/2015 | Campbell | ............. | G01J 3/50 |
| | | | | 250/349 |
| 2015/0186903 A1* | 7/2015 | Takahashi | .......... | G06Q 30/0201 |
| | | | | 356/5.1 |
| 2015/0193716 A1* | 7/2015 | Tanigawa | .......... | G06Q 10/06393 |
| | | | | 705/7.39 |
| 2015/0206188 A1* | 7/2015 | Tanigawa | .......... | G06Q 30/0261 |
| | | | | 705/14.58 |
| 2015/0213396 A1* | 7/2015 | Iwai | .................. | G06Q 10/063114 |
| | | | | 705/7.15 |
| 2015/0213498 A1* | 7/2015 | Ito | .................. | G06Q 30/0261 |
| | | | | 705/14.58 |
| 2015/0262460 A1* | 9/2015 | Ito | .................. | G08B 13/22 |
| | | | | 340/568.1 |
| 2015/0379494 A1* | 12/2015 | Hiroi | .................. | G01B 11/002 |
| | | | | 705/16 |
| 2016/0019514 A1* | 1/2016 | Landers, Jr. | ......... | G06Q 20/201 |
| | | | | 705/20 |
| 2016/0055566 A1* | 2/2016 | Otani | .................. | G06Q 30/02 |
| | | | | 705/7.29 |
| 2016/0106236 A1* | 4/2016 | Kwiatek | .................. | A47F 11/06 |
| | | | | 108/50.11 |
| 2016/0196575 A1* | 7/2016 | Uchida | ............. | G06Q 30/0261 |
| | | | | 705/14.45 |
| 2016/0203499 A1* | 7/2016 | Yamashita | ............. | G06Q 30/02 |
| | | | | 705/7.29 |
| 2016/0210829 A1* | 7/2016 | Uchida | .................. | G06T 7/20 |
| 2017/0032349 A1* | 2/2017 | Nishida | .................. | G06Q 30/06 |
| 2017/0061475 A1* | 3/2017 | Kuwabara | ............. | G09F 19/00 |
| 2017/0068969 A1* | 3/2017 | Arai | .................. | G06Q 30/06 |
| 2017/0140360 A1* | 5/2017 | Naito | .................. | G06K 9/00771 |
| 2017/0255947 A1* | 9/2017 | Horikawa | .......... | G06K 9/00335 |
| 2017/0277943 A1* | 9/2017 | Shingu | .................. | G06K 9/00335 |
| 2017/0337508 A1* | 11/2017 | Bogolea | .................. | G05D 1/0274 |
| 2018/0002109 A1* | 1/2018 | Yamashita | .......... | B65G 1/137 |
| 2018/0068168 A1* | 3/2018 | Miyakoshi | .......... | G06K 9/6254 |
| 2018/0150685 A1* | 5/2018 | Ebrom | .................. | G06K 9/00335 |
| 2018/0240089 A1* | 8/2018 | Okamoto | .......... | G06K 9/00221 |
| 2018/0293598 A1* | 10/2018 | Sato | .................. | G06Q 10/06 |

FOREIGN PATENT DOCUMENTS

| | | |
|---|---|---|
| JP | 2009-126660 | 6/2009 |
| JP | 2010-170199 | 8/2010 |
| JP | 2011-197936 | 10/2011 |
| JP | 2011-253344 | 12/2011 |
| WO | WO 2014/017001 A1 | 1/2014 |

OTHER PUBLICATIONS

International Search Report dated Jul. 8, 2014 in corresponding International Application No. PCT/JP2014/062635.

* cited by examiner

FIG.5

| PRODUCT ID | PRODUCT | ATTRIBUTE |
|---|---|---|
| S001 | PERFUME 3A | YOUTH, FEMALE, ... |
| S002 | PERFUME 3B | YOUTH, MALE, ... |
| S003 | PERFUME 3C | SENIOR, FEMALE, ... |
| S004 | PERFUME 3D | SENIOR, MALE, ... |

FIG.6

| CONTENT ID | TIME | FILE TYPE | SITE OF STORAGE | PRODUCT ID |
|---|---|---|---|---|
| C001 | 6 sec. | avi | C:\aaaa\bbbb\cccc | S001 |
| C002 | 6 sec. | avi | C:\aaaa\bbbb\cccc | S002 |
| C003 | 6 sec. | mp4 | C:\aaaa\bbbb\cccc | S003 |
| C004 | 6 sec. | mp4T | C:\aaaa\bbbb\cccc | S004 |
| ⋮ | ⋮ | ⋮ | ⋮ | ⋮ |

| PRODUCT ID | PRODUCT | TOP NOTE | MIDDLE NOTE | BASE NOTE |
|---|---|---|---|---|
| S001 | PERFUME 3A | YUZU | ROSE BLOSSOM | WHITE WOOD ACCORD |
| S002 | PERFUME 3B | TOBACCO LEAF | VANILLA | COCOA |
| S003 | PERFUME 3C | MANDARIN | PEONY | WHITE MUSK |
| S004 | PERFUME 3D | TANGERINE | STAR MAGNOLIA | AMBER CRYSTAL |
| ⋮ | ⋮ | ⋮ | ⋮ | ⋮ |

PRODUCT INFORMATION OUTPUTTING METHOD, CONTROL DEVICE, AND COMPUTER-READABLE RECORDING MEDIUM

CROSS-REFERENCE TO RELATED APPLICATION

This application is a continuation application of International Application No. PCT/JP2014/062635, filed on May 12, 2014 and designating the U.S., the entire contents of which are incorporated herein by reference.

FIELD

The embodiments discussed herein are related to a product information outputting method, a product information outputting program, and a control device.

BACKGROUND

There is a proposed technology for detecting whether a displayed product is picked up from captured images. For example, there is a technology in which identifying information on each product is stored in association with the position of display of each product, the motion of a hand of a customer is monitored from captured images and, when it is recognized that a product is picked up, the picked-up product is specified from the position from which the product is picked up.

Patent Document 1: Japanese Laid-open Patent Publication No. 2004-171240

In the related technology, however, products are stored in advance in association with positions of display and therefore when, for example, a customer temporarily holds a product and thus the position of the product changes, it is not possible to detect that the product is picked up.

SUMMARY

According to an aspect of the embodiments, a product information outputting method includes: detecting that a hand of a person is present in a first area that is set according to a position of a product; and when the hand of the person is not detected in any one of the first area and a second area and the product is not detected in a product detection area after presence of the hand was detected based on the detecting, determining that the product has been moved out of the product detection area, the second area containing the first area, the product detection area set according to the position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a table representing an exemplary data configuration of product information;

FIG. 6 is a table representing an exemplary data configuration of display content information;

DESCRIPTION OF EMBODIMENTS

Preferred embodiments will be explained with reference to accompanying drawings. Note that the embodiments are not construed as limiting the invention. It is possible to combine embodiments as appropriate as long as no contradiction is caused in the content of the processes.

[a] First Embodiment

Store Layout

Figure 1:
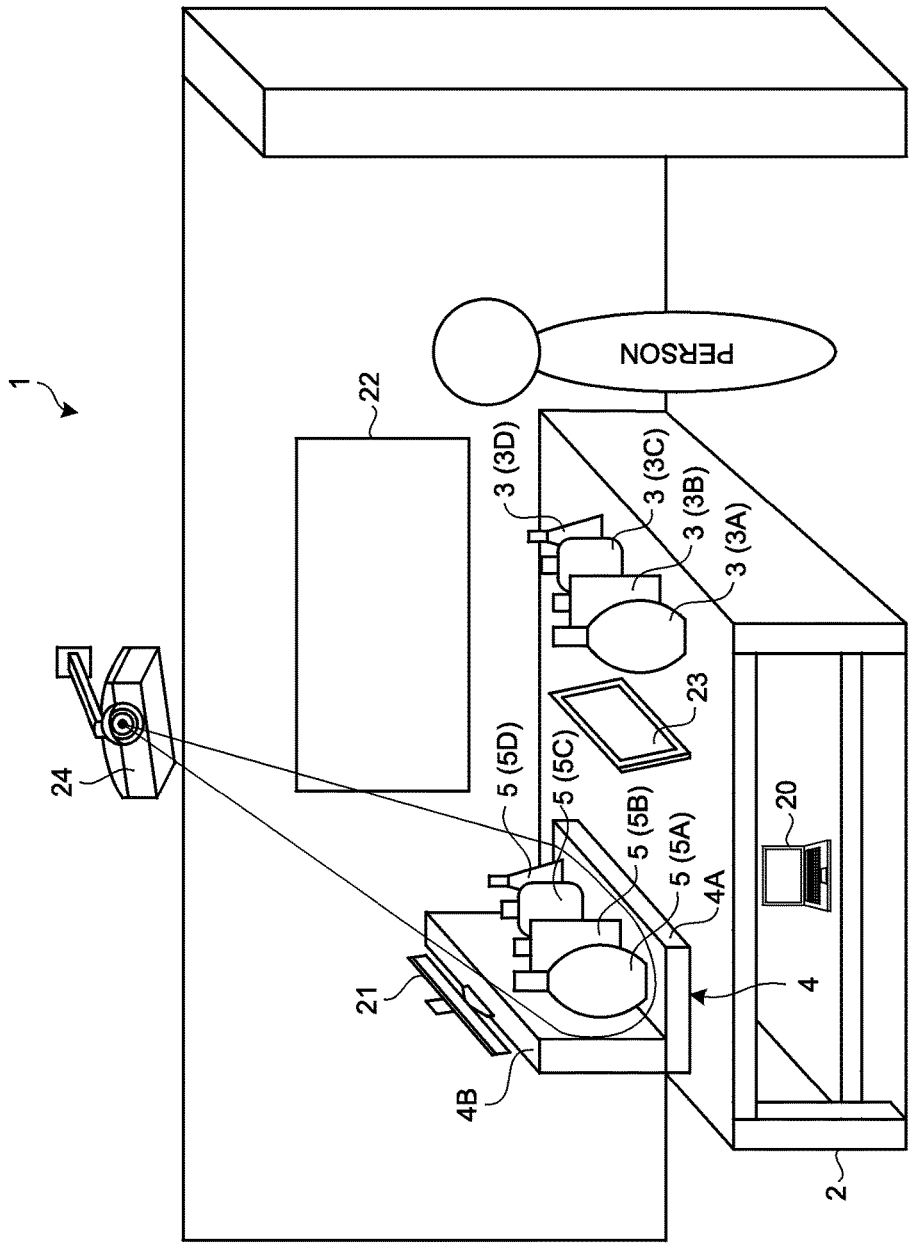
FIG. 1 is a diagram illustrating an exemplary layout of a store.

First of all, an exemplary layout of a store that promotes a product by using a product information display system according to a first embodiment will be described. FIG. 1 is a diagram illustrating an exemplary layout of a store. As illustrated in FIG. 1, a product shelf 2 on which products are displayed is provided in a store 1. The product shelf 2 has a tabular upper surface and is arranged on a side of an aisle where people can pass through and products are displayed along the aisle. The first embodiment exemplifies a case where the products are perfumes 3. Specifically, four types of perfumes 3A to 3D are displayed as products on the product shelf 2. The products are not limited to perfumes and furthermore the number of types of products is not limited to four.

On the product shelf 2 viewed from the aisle, a tablet terminal 23 is arranged with its display facing the aisle on the back of the perfumes 3A to 3D. Furthermore, on the product shelf 2 viewed from the aisle, a display table 4 for displaying products is arranged on the back of the tablet terminal 23. The display table 4 has a tabular shape and has an upright back side and thus the cross section of the display table 4 is L-shaped, i.e., the display table 4 is formed of a stand part 4A and a wall part 4B. On the stand part 4A, perfumes 5 that are of the same types as the perfumes 3 placed on the product shelf 2 and that are physically different from the perfumes 3 are arranged. In the first embodiment, perfumes 5A to 5D that are of the same types as the four types of perfumes 3A to 3D and that are physically different from the perfumes 3A to 3D are arranged in the same order in which the perfumes 3A to 3D are arranged in association with the positions in which the perfumes 3A to 3D are arranged in the same order as that in which the perfumes 3A to 3D are arranged. The perfumes 5 may be of the same types as the perfumes 3 or may be models whose appearance is strikingly similar to the perfumes 3. A sensor device 21 is provided on the wall part 4B. The sensor device 21 is human-detectable and is arranged such that the aisle side is a detection area. A control device 20 is arranged in the product shelf 2.

In the store 1, a projector 24 is provided. The projector 24 is arranged such that the perfumes 5A to 5D are within a projection area to which video images are projectable, and video images are projectable to the perfumes 5A to 5D. The projector 24 may be fixed on the ceiling of the store 1 or may be fixed on the wall.

In the store 1, a display 22 is provided on a surrounding wall. The display 22 has a display surface in a size larger than the tablet terminal 23 so as to be viewed from positions in a wide area in the store 1 and the display 22 is arranged in a position more distant from the positions of the perfumes 3A to 3D than the tablet terminal 23 is distant from the positions of the perfumes 3A to 3D. The tablet terminal 23 is arranged in a position close to the perfumes 3A to 3D such that the display surface of the tablet terminal 23 is viewable by a customer when the customer is positioned in front of the perfumes 3A to 3D.

System Configuration

Figure 2:
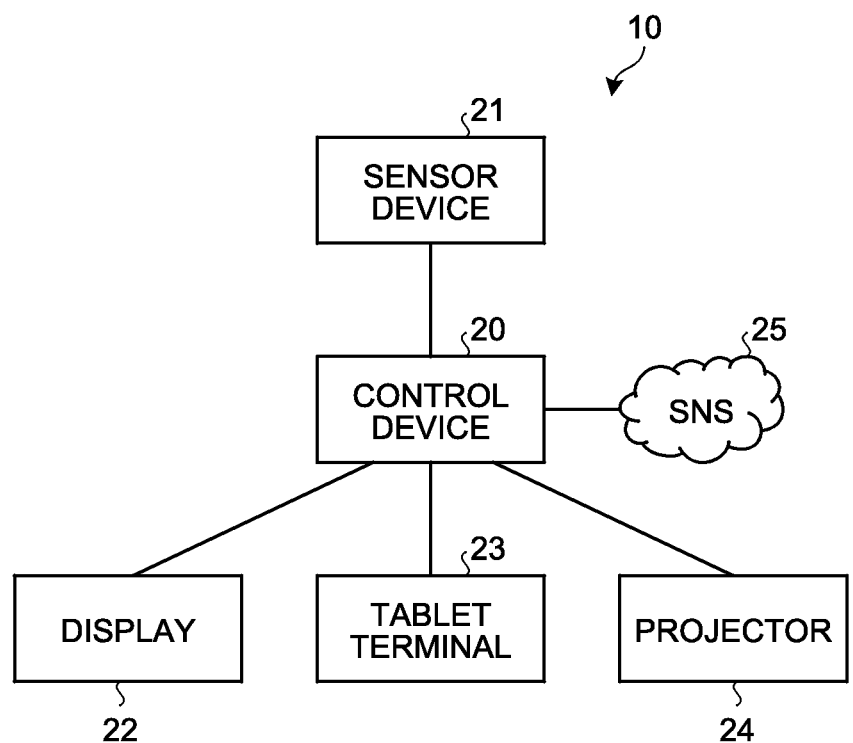
FIG. 2 is a diagram of an exemplary schematic configuration of an entire product information display system.

The product information display system according to the first embodiment will be described here. FIG. 2 is a diagram of an exemplary schematic configuration of the entire product information display system. As illustrated in FIG. 2, the product information display system 10 includes the control device 20, the sensor device 21, the display 22, the tablet terminal 23, and the projector 24.

The sensor device 21 is a human detectable sensor device. For example, the sensor device 21 incorporates a camera, captures an image with the camera at a given frame rate, and detects a human body from the captured image. Upon detecting a human body, the sensor device 21 analyzes the skeleton to specify the positions of human body parts, such as the head and fingers. The sensor device 21 then outputs image data of the captured image and positional information representing the position of each of the human body parts. For example, there is KINECT (trademark) as an example of the sensor device 21.

Figure 3:
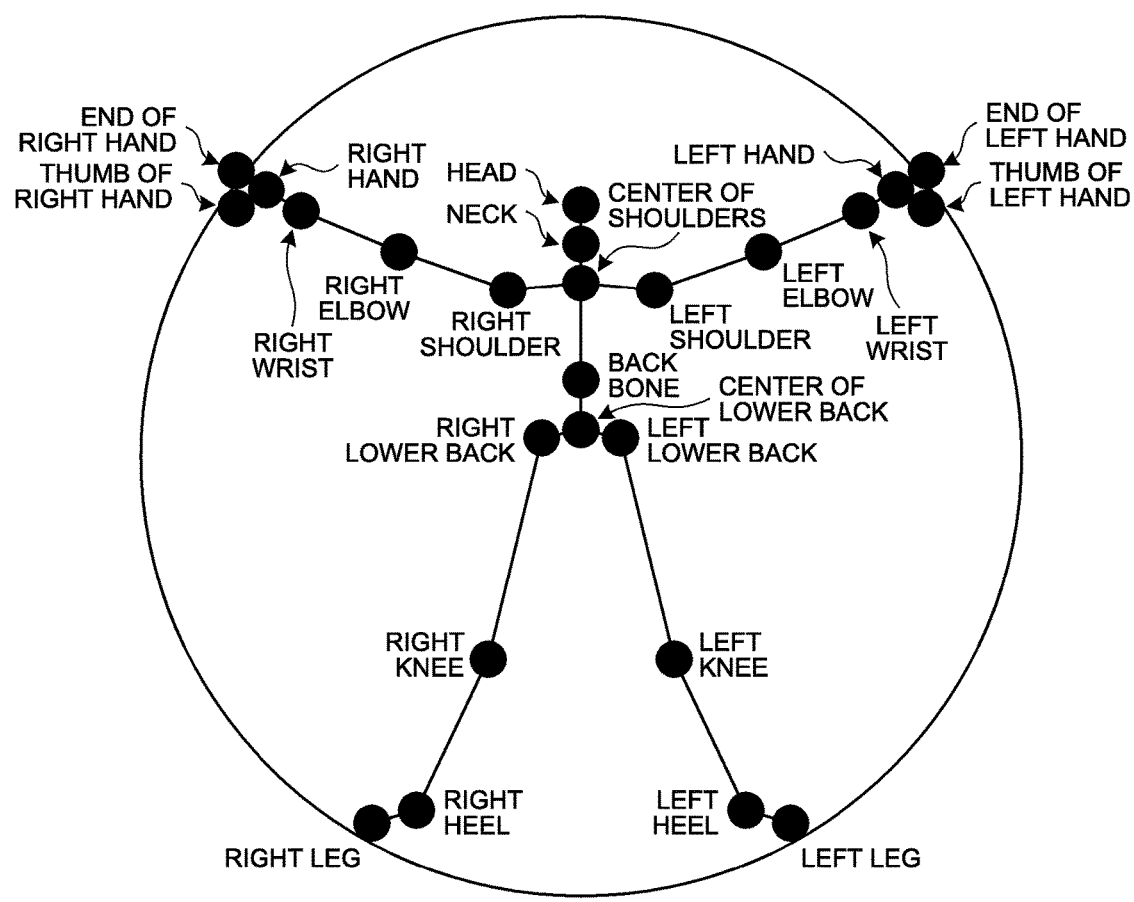
FIG. 3 is a diagram of exemplary positional information that represents the positions of parts of a human body and that is output from a sensor device.

FIG. 3 is a diagram of exemplary positional information that represents the positions of human body parts that and that is output from the sensor device. In the example illustrated in FIG. 3, the position of each of the human body parts represented by the positional information is represented by a dot and human skeleton parts are represented by connecting the dots.

FIG. 2 will be referred back here. The display 22 is a display device that displays various types of information. There are a liquid crystal display (LCD) or a cathode ray tube (CRT) as an example of the display 22. The display 22 displays various types of information. For example, in the first embodiment, the display 22 displays various images, such as advertising video images.

The tablet terminal 23 is a terminal device that is capable of displaying various types of information and in which various types of information can be input. In the first embodiment, the tablet terminal 23 is used as a display device for promotion to individual customers. A display or a laptop personal computer may be used instead of the tablet terminal 23 as the display device.

The projector 24 is a projection device that projects various types of information. The projector 24 projects various types of information for display. For example, the projector 24 projects a video image representing an image representing a product. For example, the projector 24 projects a video image representing the scent emitted from the product, the taste or feel of the product, or the sound emitted from the product. In the first embodiment, the projector 24 projects video images representing the respectively emitted scents to the perfumes 5A to 5D.

The control device 20 is a device that controls the entire product information display system 10. The control device 20 is, for example, a computer, such as a personal computer or a server computer. The control device 20 may be implemented with a single computer or may be implemented with multiple computers. The first embodiment exemplifies the case where the control device 20 is a single computer.

The control device 20 is connected to the sensor device 21 and is capable of detecting a customer via the sensor device 21. The control device 20 is connected to the display 22, the tablet terminal 23, and the projector 24 and controls the display 22, the tablet terminal 23, and the projector 24, thereby controlling video images to be displayed. The control device 20 is communicably connected to a social networking service (SNS) 25 via a network (not illustrated) and thus is able to exchange various types of information. It is possible to employ, as a form of the network, any type of network regardless whether it is wireless or wired, such as mobile communications with, for example, a mobile phone, the Internet, a local area network (LAN), or a virtual private network (VPN).

The SNS 25 is a cloud system that provides social media enabling users to post and exchange messages to communicate information. The SNS 25 may be implemented with a single computer or with multiple computers. The SNS 25 is, for example, Twitter (trademark) or Facebook (trademark).

Configuration of Control Device

Figure 4:
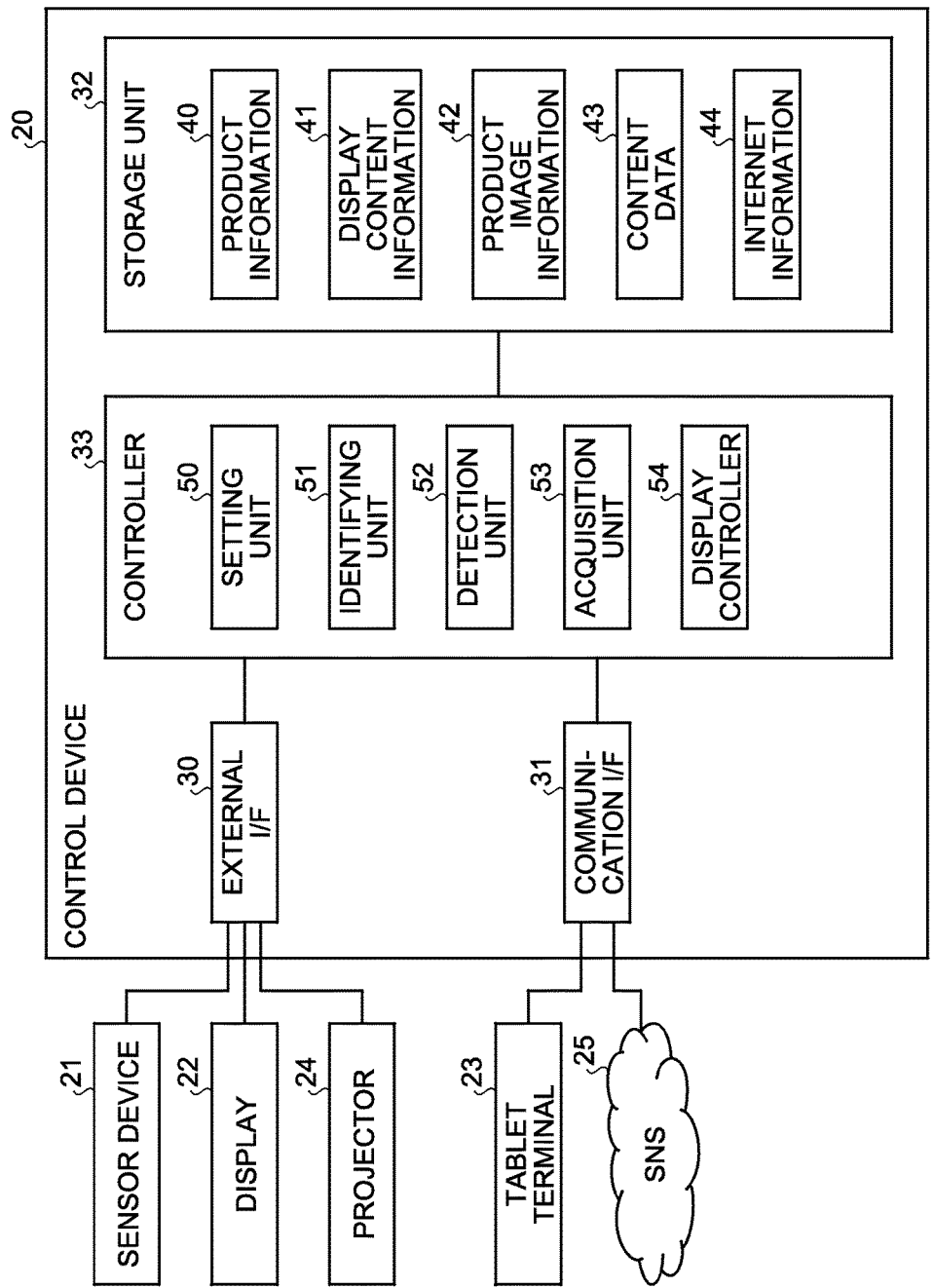
FIG. 4 is a diagram of an exemplary functional configuration of a control device.

The configuration of the control device 20 according to the first embodiment will be described here. FIG. 4 is a diagram of an exemplary functional configuration of the control device. As illustrated in FIG. 4, the control device 20 includes an external I/F (interface) 30, a communication I/F 31, a storage 32, and a controller 33.

The external I/F 30 is an interface that inputs and outputs various types of data. The external I/F 30 may be a general-purpose interface, such as a universal serial bus (USB). Alternatively, the external I/F 30 may be an interface for video image, such as a D-sub (D-subminiature), a DVI (Digital Visual Interface), a DisplayPort, a HDMI (trademark) (High-Definition Multimedia Interface).

The external I/F 30 inputs and outputs various types of information to and from connected other devices. For example, the external I/F 30 is connected to the sensor device 21 and image data of a captured image and positional information representing the positions of human body parts are input to the external I/F 30 from the sensor device 21. The external I/F 30 is connected to the display 22 and the projector 24 and outputs data of video images to be displayed on the display 22 and to be projected from the projector 24.

The communication I/F 31 is an interface that controls communications with other devices. It is possible to use a network interface card, such as a LAN card, as the communication I/F 31.

The communication I/F 31 transmits and receives various types of information to and from other devices via the network (not illustrated). For example, the communication I/F 31 transmits data of a video image to be displayed on the tablet terminal 23. The communication I/F 31 also receives information on a posted message from the SNS 25.

The storage 32 is a storage device that stores various types of data. For example, the storage 32 is a storage device, such as a hard disk, a solid state drive (SSD), or an optical disk. The storage 32 is a data-rewritable semiconductor memory, such as a random access memory (RAM), a flash memory, or a non-versatile static random access memory (NVS-RAM).

The storage 32 stores an operating system (OS) and various programs to be executed by the controller 33. For example, the storage 32 stores various programs including a program for performing a display control process, which will be described below. Furthermore, the storage 32 stores various types of data used for the programs to be executed by the controller 33. For example, the storage 32 stores product information 40, display content information 41, product image information 42, content data 43, and Internet information 44.

The product information 40 is data in which information on a product to be promoted is stored. In the first embodiment, information on the perfumes 3A to 3D is stored in the product information 40. For example, in the product information 40, information on the product, such as the product name, and information on, for example, targeted buyers is stored with respect to each product.

FIG. 5 is a table of an exemplary data configuration of the product information. As represented in FIG. 5, the product information 40 has items "product ID", "product" and "attribute". The item of product ID is an area in which identifying information that identifies the products is stored. Unique product IDs are assigned as identifying information that identifies each product. The product IDs assigned to the products are stored in the item of product ID. The item of product is, for example, an area in which information representing the product, such as the names of products, is stored. The item of attribute is an area in which information on buyers targeted by the products is stored.

The example illustrated in FIG. 5 represents that the product ID "S001" corresponds to the product "perfume 3A" and the attribute of targeted buyers "youth and female". The example also represents that the product ID "S002" corresponds to the product "perfume 3B" and the attribute of targeted buyers "youth and male". The example also represents that the product ID "S003" corresponds to the product "perfume 3C" and the attribute of targeted buyers "senior and female". The example represents that the product ID "S004" corresponds to the product "perfume 3D" and the attribute of targeted buyers "senior and male".

FIG. 4 will be referred back here. The display content information 41 is data in which information on the content is stored. For example, information representing which type of data the content is or where the content is stored is stored in the display content information 41.

FIG. 6 is a table of an exemplary data configuration of the display content information. As represented in FIG. 6, the display content information 41 has items of "content ID", "time", "file type", "site of storage" and "product ID". The item of content ID is an area in which identifying information that identifies the content is stored. Unique content IDs are assigned as identifying information that identifies each set of content. The content IDs assigned to the content are stored in the item of content ID. The item of time is an area in which the times each for reproducing a video image saved as the content are stored. The item of file type is an area in which the types of content data are stored. The item of site of storage is an area in which sites in each of which content data is stored and the file names of content data are stored. In the first embodiment, a pass to the content data is stored in the site of storage. The item of product ID is an area in which identifying information that identifies the products is stored.

The example illustrate in FIG. 6 represents that the content ID "C001" corresponds to the reproduction time "6 seconds", the file type "avi", the site of storage "C:¥aaaa¥bbbb¥cccc C:", and the associated product ID "S001". The file type "avi" represents an audio video interleaving (avi) file. The content ID "C002" corresponds to the reproduction time "6 seconds", the file type "avi", the site of storage "C:¥aaaa¥bbbb¥cccc", and the associated product ID "S002". The content ID "C003" corresponds to the reproduction time "6 seconds", the file type "mp4", the storage site "C:¥aaaa¥bbbb¥cccc", and the associated product ID "S003". The file type "MP4" represents MPEG-4 (Moving Picture Experts Group Phase 4). The content ID "C004" corresponds to the reproduction time "6 seconds", the file type "mp4T", the storage site "C:¥aaaa¥bbbb¥cccc", and the associated product ID "S004". The file type "MP4T" represents MPEG-4 Transport Stream.

FIG. 4 will be referred back here. The product image information 42 is data in which information on the product image is stored. For example, information on images each representing the scent emitted from the product, the taste or feel of the product, or the sound emitted by the product is stored in the product image information 42. In the first embodiment, information on images representing the scent emitted from the perfumes 5A to 5D is stored.

Figures 7, 8:
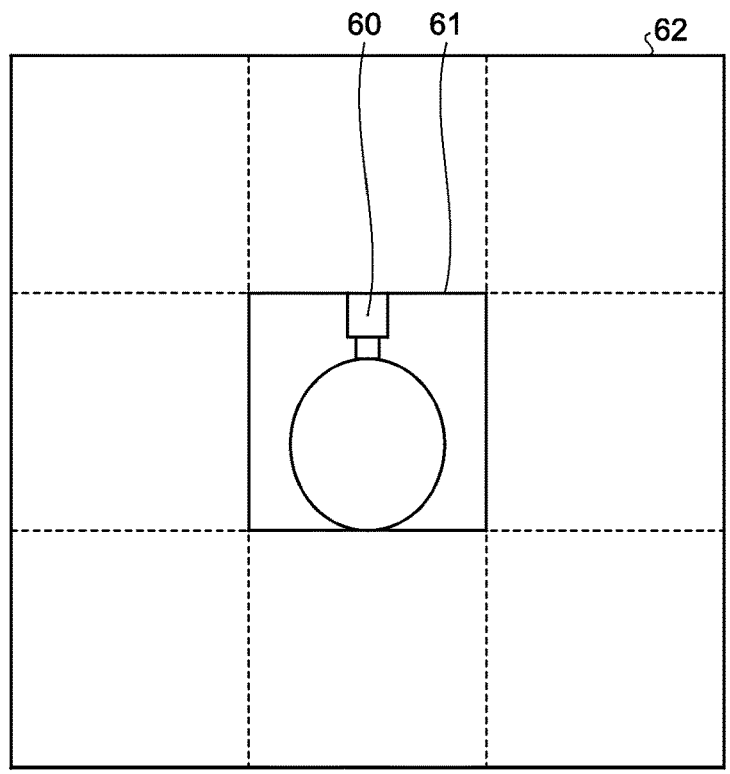
FIG. 7 is a table representing an exemplary data configuration of product image information.
FIG. 8 is a diagram of an exemplary area.

FIG. 7 is a diagram of an exemplary data configuration of product image information. As illustrated in FIG. 7, the product image information 42 has items of "product ID", "product", "top notes", "middle notes", and "base notes". The item of product ID is an area in which identifying information that identifies products is stored. The item of product is an area in which information representing products is stored. The item of top notes, middle notes, and base notes are areas in each of which information on an image representing the scent of each product is stored. Note that the scent of a perfume varies according to the elapse of time. The item of top notes is an area in which information representing images of the scents in 10 to 30 minutes after application of the perfumes is stored. The item of middle notes is an area in which information representing images of the scents in two to three hours after application of the perfumes is stored. The item of base notes is an area in which information representing images of the scents in five to twelve hours after application of the perfumes is stored.

In the example illustrated in FIG. 7, the product ID "S001" corresponds to the product "perfume 3A", the top notes "yuzu", the middle notes "rose blossom", and the base notes "white wood accord".

FIG. 4 will be referred back here. The content data 43 is data in which the content, such as video images and images that are used to promote the products, is stored. For example, the video image data represented by the display content information 41 is stored as the content data 43. For example, data of advertising video images that promote the perfumes 3A to 3D is stored as the content data. Furthermore, data of images associated with images of the scents of the respective items of top notes, middle notes, and base notes of the product image information 42 is stored as the content data 43.

The Internet information 44 is data in which information on each product acquired from the Internet is stored. For example, information on each product acquired from the SNS 25 is stored in the Internet information 44.

The controller 33 is a device that controls the control device 20. It is possible to use, as the controller 33, an electronic circuit, such as a central processing unit (CPU) or micro processing unit (MPU), or an integrated circuit, such as an application specific integrated circuit (ASIC) or a field programmable gate array (FPGA). The controller 33 has an internal memory for storing the programs that define various process procedures and control data and executes various processes by using the programs and the control data. The various programs run and the controller 33 accordingly functions as various processors. For example, the controller 33 includes a setting unit 50, an identifying unit 51, a detection unit 52, an acquisition unit 53, and a display controller 54.

The setting unit 50 makes various settings. For example, the setting unit 50 sets an area for detecting a pickup of a product. For example, the setting unit 50 detects an area of each product from the captured image that is input from the sensor device 21. For example, the setting unit 50 detects the areas of the perfumes 3A to 3D from the captured image based on the characteristics of the perfumes 3A to 3D, such as their colors and shapes. The setting unit 50 sets, with respect to each product, a first area corresponding to the position of the product. For example, the setting unit 50 sets, with respect to each product, a rectangular area surrounding the area of the product as the first area. The first area is an area for determining whether a customer touches the product. The setting unit 50 then sets, with respect to each product, a second area containing the first area. For example, the setting unit 50 sets, with respect to each product, a second area obtaining by arranging areas having the same size one by one. The second area is an area for determining whether a customer picks up an item.

FIG. 8 is a diagram of an exemplary area. For example, the setting unit 50 detects an area 60 of the perfume 3A from the captured image based on the characteristics of the perfume 3A, such as its color and shape. The setting unit 50 sets a rectangular area surrounding the area of the perfume 3A as a first area 61. The setting unit 50 sets, for example, a second area 62 obtained by arranging areas, each having the same size as that of the first area 61, one by one around the first area 61.

The identifying unit 51 performs various types of identification. For example, the identifying unit 51 identifies the attribute of a person who is detected by the sensor device 21. For example, the identifying unit 51 identifies, as the attribute of the person, the gender and age group of the detected person. In the first embodiment, the age group is identified between two groups of youth and senior. For example, with respect to each gender and each group of age, a standard pattern of, for example, the facial contour and the positions of the eyes, nose and mouth is stored in advance in the storage 32. When the sensor device 21 detects a person, the identifying unit 51 detects the face area from the image that is input from the sensor device 21. The identifying unit 51 compares the facial contour and the positions of the eyes, nose and mouth in the detected facial area with the standard pattern with respect to each gender and each age group and specifies the most similar standard pattern to identify the gender and the age group. Identification of the attribute of the person may be performed by the sensor device 21. In other words, the sensor device 21 may identify the attribute of a person and output information on the attribute that is the result of the identification to the control device 20.

The detection unit 52 performs various types of detection. For example, the detection unit 52 detects whether the product is picked up, with respect to each product. For example, the detection unit 52 monitors the first area of each product that is set by the setting unit 50 in captured images that are input from the sensor device 21 and detects whether a hand of a person enters the first area. For example, when the set of coordinates of a finger of a hand of the person that is input from the sensor device 21 is within the first area, the detection unit 52 detects that the hand of the person enters the first area. For example, in the example illustrated in FIG. 3, the detection unit 52 regards a finger part, such as the end of the left hand, the end of the right hand, the thumb of the left hand, or the thumb of the right hand, as a hand of a person and detects whether a hand of the person enters the first area.

When a hand of a person is not detected in the second area after the detection unit 52 detects the hand of the person in the first area, the detection unit 52 determines whether the product is detected in the area of the product. When the product is not detected in the area of the product, the detection unit 52 detects that the product is picked up. For example, when the detection unit 52 detects that a hand of a person enters a first area that is set with respect to the product 3A and thereafter the hand of the person is not detected in a second area that is set with respect to the product 3A and the product 3A is not detected, either, the detection unit 52 that the product 3A is picked up. Note that only one product may be detected by the detection unit 52 or multiple products may be detected by the detection unit 52. When a hand of a person is not detected in the first area after the detection unit 52 detects the hand of the person in the first area, the detection unit 52 may determine whether the product is detected in the area of the product. Setting an area for detecting a pickup of a product and detecting whether the product is picked up by using the area may be performed by the sensor device 21. In other words, the sensor device 21 may set an area for detecting a pickup of a product, detect whether the product is picked up by using the area, and output information on the result of the detection to the control device 20.

Figure 9:
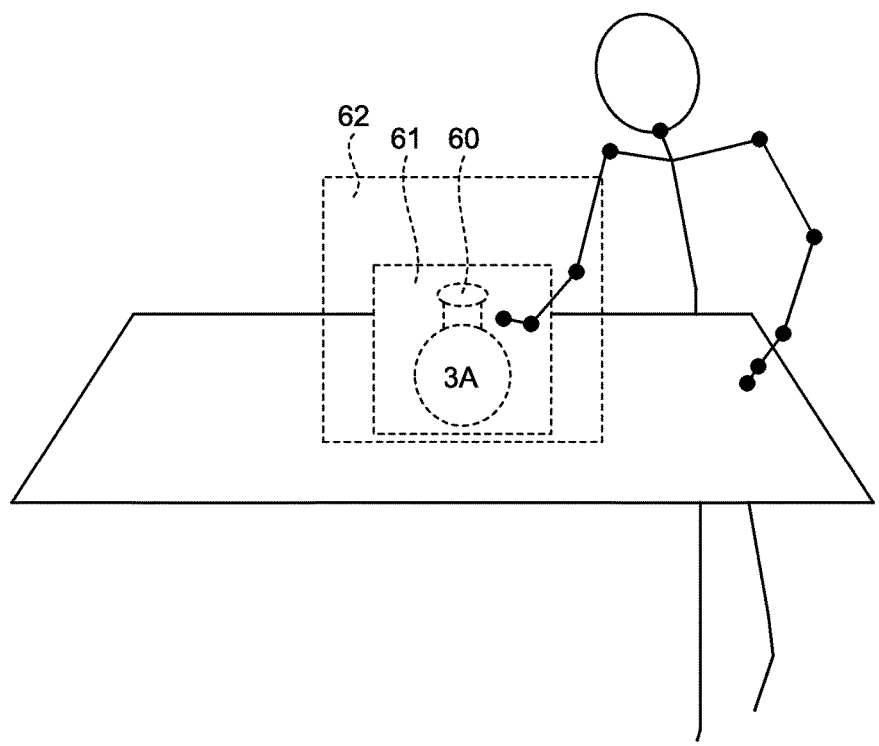
FIG. 9 is a diagram illustrating detection of a pickup.

FIG. 9 is a diagram illustrating detection of a pickup. For example, the detection unit 52 monitors the first area 61 to detect whether a hand of a person enters the first area 61. In the example illustrated in FIG. 8, a hand of a person enters the first area 61. The detection unit 52 detects that the perfume 3A is picked up when a hand of a person is not detected in the second area where the hand of the person was detected and the product is not detected in the area of the perfume 60. Accordingly, it is possible to distinguish between a case where the product is touched only and a case where the product is picked up.

The acquisition unit 53 performs various types of acquisition. For example, the acquisition unit 53 acquires information on each product from the Internet. For example, the acquisition unit 53 searches posts on each product on the SNS 25 and acquires information on each product from the SNS 25. The acquisition unit 53 may accept posts on each product on the SNS 25 and acquire information on each product from the SNS 25. For example, the SNS 25 regularly provides posts on each product to the control device 20 and the acquisition unit 53 may acquire the provided information on each product.

The acquisition unit 53 stores the acquired posts on each product in the Internet information 44.

The display controller 54 controls various displays. For example, when the sensor device 21 does not detect any person, the display controller 54 causes the display 22 to display product information according to a given scenario. For example, the display controller 54 causes the display 22 to display video images of the content of the respective products according to a given order repeatedly. The display controller 54 may cause the display 22 to display a video image different from the video images of the content of the respective products. For example, data of a video image of advertising product information according to a given scenario may be stored in addition to the content video images of the respective products in the storage 32 and, when the sensor device 21 does not detect any person, the display controller 54 may cause the display 22 to repeatedly display the data of the video image.

When the sensor device 21 detects a person, the display controller 54 specifies a product corresponding to the attribute of the person that is identified by the identifying unit 51. For example, when the attribute of the person is identified as "youth" and "female", the display controller 54 specifies the perfume 3A corresponding to "youth" and "female" as the corresponding product. The display controller 54 causes the display 22 to display information on the specified product. For example, based on the display content information 41, the display controller 54 reds the data of the content corresponding to the specified perfume 3A from the content data 43 and causes the display 22 to display the video image of the read content.

After causing the display 22 to display the video image of the content, the display controller 54 determines whether the sensor device 21 detects a given behavior of the person. The given behavior is a behavior representing whether the person is interested in the video image. For example, when a person is interested in a video image displayed on the display 22, the person stops to watch the video image. For example, when a detected person keeps stopping after a given length of time elapses from the start of display of the video image on the display 22, the display controller 54 determines that the given behavior is detected. The given behavior is not limited to stopping of the detected person for a given length of time. The given behavior may be any behavior as long as the behavior represents that the person is interested in. For example, when a person is detected after a video image is displayed on the display 22, it may be determined that the given behavior is detected. Furthermore, for example, the lines of sight of the detected person are detected. When the lines of sight of the person have been toward the display 22 or toward the product corresponding to the video image displayed on the display 22 for a given length of time, it may be determined that the given behavior is detected.

Once the given behavior of the person is detected, the display controller 54 causes the tablet terminal 23 to display information on the product. For example, the display controller 54 reads, from the Internet information 44, information on the specified product acquired from the Internet and causes the tablet terminal 23 to display the read information.

Once the given behavior of the person is detected, the display controller 54 causes the display 22 to end displaying the video image of the content. After causing the display 22 to end displaying the video image of the content, as in the case where no person is detected, the display controller 54 causes the display 22 to display the product information according to the given scenario. For example, the display controller 54 causes the display 22 to repeatedly display video images of the content of the respective products according to a given order.

When the detection unit 52 detects that the product is picked up, the display controller 54 outputs the video image associated with the picked-up product. For example, the display controller 54 reads the data of the content corresponding to the picked-up product and causes the projector 24 to project the video image of the read content to be projected. For example, when the perfume 3A is picked up, a video image is projected to the perfume 5A that is of the same type as that of the perfume 3A and that is arranged on the display table 4. The display controller 54 changes the video image to be projected from the projector 24 according to the product image information 42 and represents the change of the scent emitted by the perfume 3A over time by using the video images. For example, the display controller 54 projects images of the top note, the middle note, and the base note sequentially at given timings to represent the change of the scent over time by using the video image. The display controller 54 may additionally project various image effects. For example, the display controller 54 changes the effects per two seconds and displays the image. Accordingly, the person who picks up the perfume 3A is able to experience a simulated change of the scent emitted by the perfume 3A over time from the video image projected with respect to the perfume 5A. The display controller 54 may project a video image representing the characteristics of the product and effects of the product. The display controller 54 may change the type of a video image to be projected according to each attribute of each person. For example, when the attribute is female, the display controller 54 may project a video image representing the scent emitted by the perfume 3 and, when the attribute is male, the display controller 54 may project a video image representing the characteristics and effects of the perfume 3.

When the detection unit 52 detects that another product is picked up during the projection of the video image, the display controller 54 outputs a video image associated with the picked-up product. For example, when a pickup of the perfume 3A is detected and then a pickup of the perfume 3B is detected during the projection of the video image to the perfume 5A, the display controller 54 stops projecting the video image to the perfume 5A. The display controller 54 then reads the data of the content corresponding to the picked-up perfume 3B and causes the projector 24 to project the video image of the read content. Accordingly, the projection of the video image to the perfume 5A is stopped and a video image is projected to the perfume 5B arranged on the display table 4.

Figure 10:
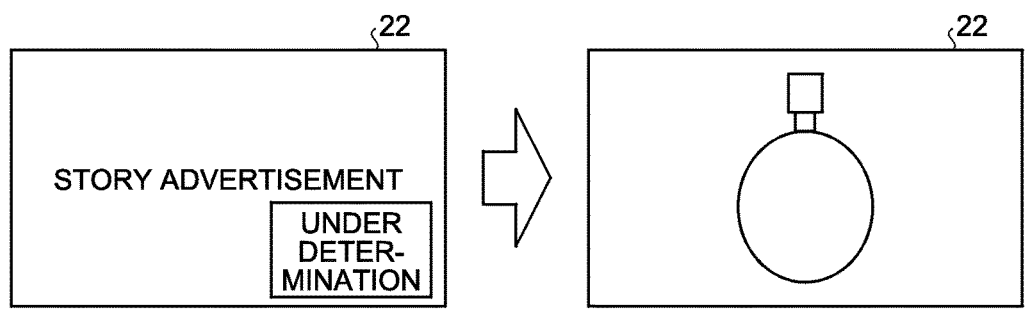
FIG. 10 is a diagram of an exemplary image that is displayed on a display.

Descriptions will be provided with a specific example. FIG. 10 is a diagram illustrating an exemplary image that is displayed on the display. When the sensor device 21 is not detecting any person, the display controller 54 causes the display 22 to display the product information according to the given scenario. The display controller 54 causes the display 22 to display the video images of the content of the respective products sequentially and repeatedly. The exemplary screen on the left in FIG. 10 displays a story advertisement according to a given scenario.

When the sensor device 21 detects a person, the identifying unit 51 identifies the attribute of the person who is detected by the sensor device 21. The display controller 54 then causes the display 22 to display a video image of the content of a product corresponding to the attribute of the identified person. According to the exemplary screen on the right in FIG. 10, when a person is detected, a video image of a perfume corresponding to the attribute of the detected person is displayed. In this manner, an advertisement of a product corresponding to the attribute of a detected person is displayed, which makes it possible to realize sales promotions where individual preferences are determined and thus increase the effects of advertisement. In the example represented in FIG. 10, the display controller 54 displays "under determination" in the story advertisement while the attribute of the person is being identified; however, "under determination" is not necessarily displayed.

Figure 11:
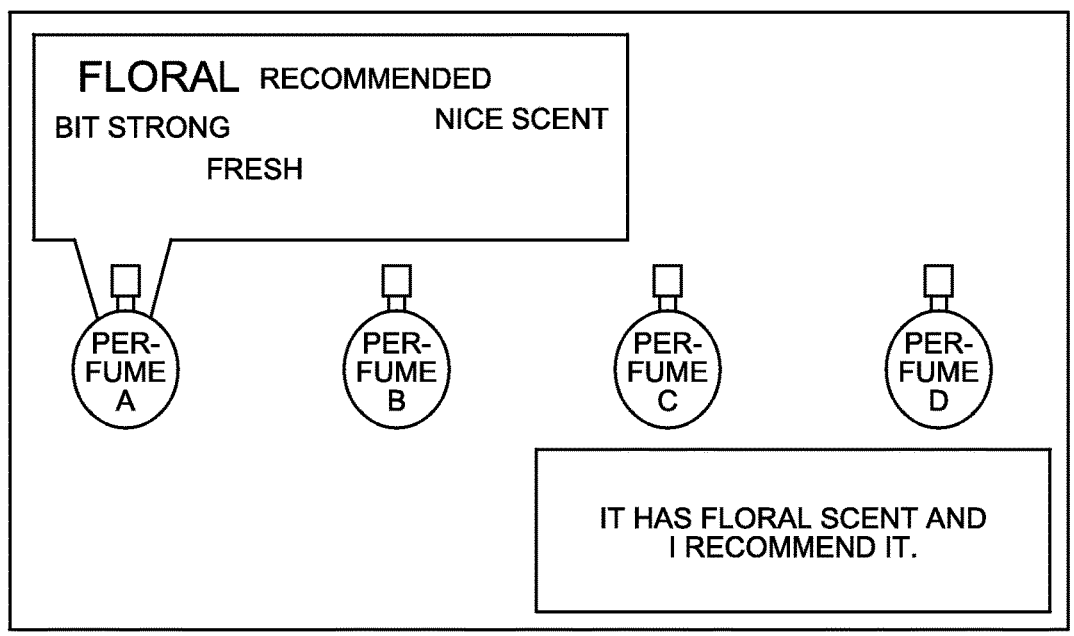
FIG. 11 is a diagram of an exemplary image that is displayed on a tablet terminal.

When the given behavior of the person is detected after the display controller 54 causes the display 22 to display the video image of the content, the display controller 54 causes the tablet terminal 23 to start displaying information on the product. For example, the display controller 54 reads information on the product corresponding to the attribute of the person, which is information that is acquired from the Internet, from the Internet information 44 and causes the tablet terminal 23 to display the read information. FIG. 11 is a diagram of an exemplary image that is displayed on the tablet terminal. According to the example represented in FIG. 11, keywords often contained in articles on the product posted on the SNS 25 are displayed such that, the larger the number of times a keyword appears, the larger the keyword is displayed. Furthermore, according to the example represented in FIG. 11, an article on the product posted on the SNS 25 is displayed. Accordingly, it is possible to represent an evaluation of a third party on the product to the detected person. In recent years, evaluations from third parties, such as word of mouth, sometimes have large effects on the purchase behavior. For example, when buying a product, we sometimes search the evaluations from third parties on, for example, the SNS 25 to examine whether to purchase the product. For this reason, providing evaluations on the product from third parties on the tablet terminal 23 makes it is possible to provide a sense of assurance and reliability on the product compared to a case where an advertisement on the product is provided simply.

Figure 12:
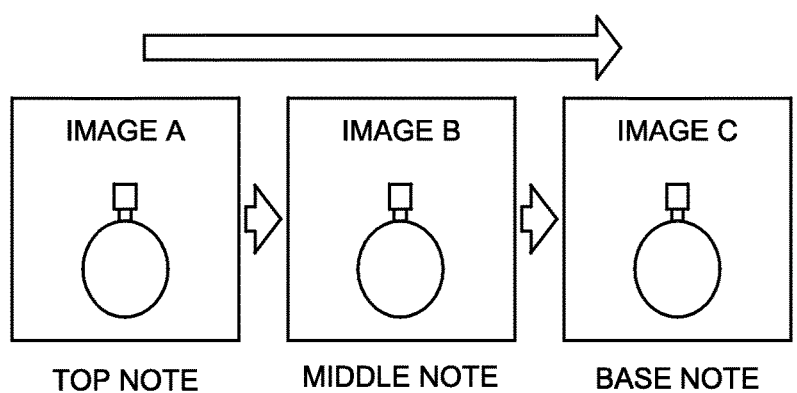
FIG. 12 is a diagram of exemplary images to be projected.

When the product is picked up, the display controller 54 projects a video image to a product that is of the same type as that of the picked-up product and that is physically different from the picked-up product. In the first embodiment, images of the top note, the middle note, and the base note are projected sequentially to the perfume 5, which is of the same type as that of the picked-up perfume 3 and is arranged separately from the perfume 3, to represent a change of the scent over time by using the video image. FIG. 12 is a diagram of exemplary images to be projected. According to the example represented in FIG. 12, the image varies sequentially in the following order: an image A representing the scent of top note, an image B representing the scent of middle note, and an image C representing the scent of base note. Projecting the video image corresponding to the picked-up perfume 3 to the perfume 5 enables an experience of a simulated change of the scent emitted by the perfume 3 over time from the projected video image. Furthermore, causing an experience of a simulated change of the scent from the projected video image makes it possible to improve the product image.

In this manner, the product information display system 10 is able to effectively promote the products to customers.

The control device 20 may further cause a display of incentive information on the products. For example, the display controller 54 may cause the tablet terminal 23 to display a discount coupon for a picked-up product in, for example, a two-dimensional barcode. Accordingly, the product information display system 10 is able to promote purchase of the product.

The control device 20 may accumulate responses of people. For example, the control device 20 accumulates, with respect to each product, the number of times a person whose attribute is a targeted attribute is detected and the number of times the given behavior and a pickup are detected, which makes it possible to evaluate whether customers targeted by the product are proper and whether the displayed video image has an effect and reconsider the content of the promotion.

Process Flow

Figure 13:
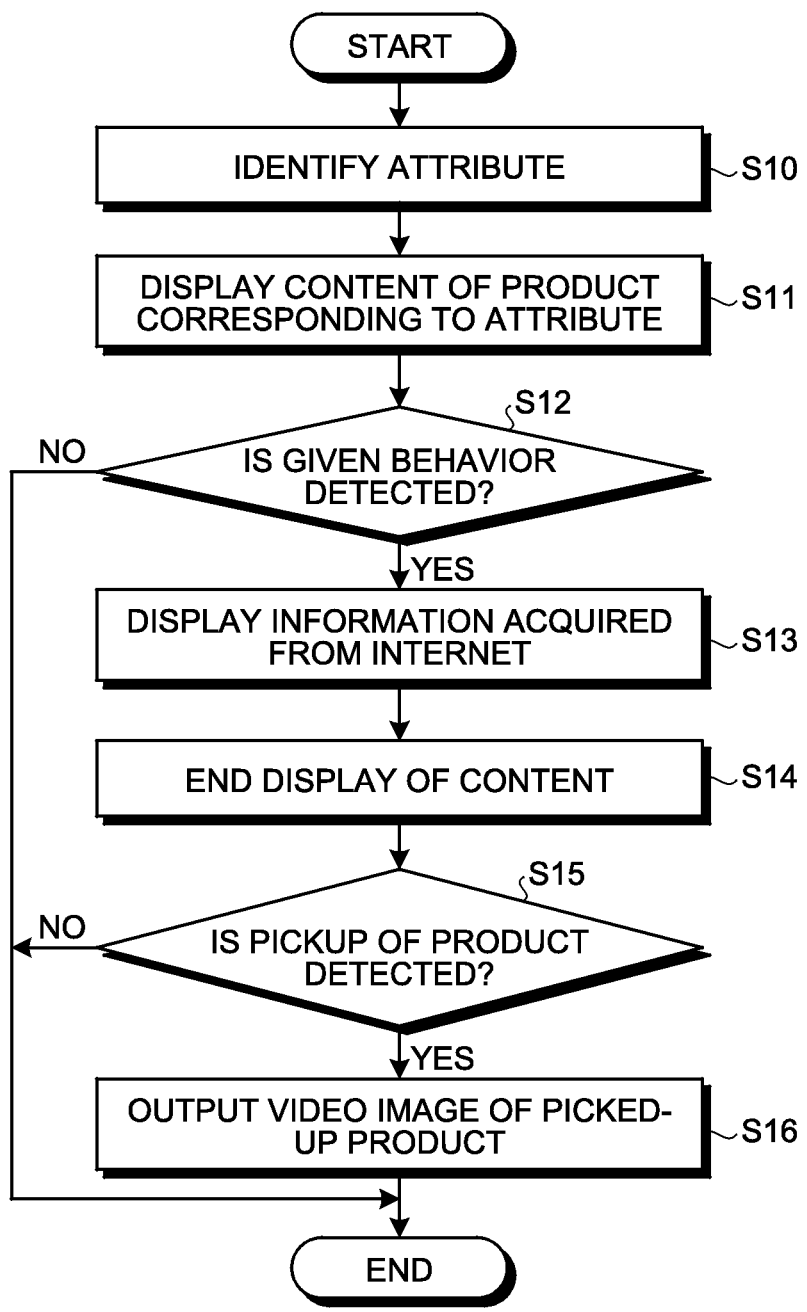
FIG. 13 is a flowchart of an exemplary procedure of a display control process.

The flow of display control performed by the control device 20 according to the first embodiment will be described. FIG. 13 is a flowchart of an exemplary procedure of the display control process. The display control process is performed at a given timing, such as a timing at which the sensor device 21 detects a person.

When the sensor device 21 is not detecting any person, the display controller 54 causes the display 22 to display video images of the content of the respective products according to a given order repeatedly.

When the sensor device 21 detects a person, as illustrated in FIG. 13, the identifying unit 51 identifies the attribute of the person who is detected by the sensor device 21 (S10). The display controller 54 causes the display 22 to display a video image of the content of a product corresponding to the identified person (S11).

The display controller 54 determines whether the given behavior of a person is detected (S12). When the given behavior is not detected (NO at S12), the display controller 54 ends the process.

On the other hand, when the given behavior is detected (YES at S12), the display controller 54 reads information on a product corresponding to the attribute of the person, which is information acquired from the Internet, from the Internet information 44 and causes the tablet terminal 23 to display the read information (S13). Furthermore, the display controller 54 causes the display 22 to end displaying the video image of the content on the display 22 (S14).

The display controller 54 determines whether the detection unit 52 detects a pickup of the product (S15). After the detection unit 52 detects a hand of the person in the first area and when the hand of the person is not detected in the second area and the product is not detected in the production detection area, the display controller 54 detects that the product is picked up. When no pickup of the product is detected (NO at S15), the display controller 54 ends the process.

On the other hand, when a pickup of the product is detected (YES at S15), the display controller 54 causes the projector 24 to output a video image associated with the picked-up product (S16). When the output of the video image ends, the display controller 54 ends the process.

Once the display control process ends, the display controller 54 causes the display 22 to display the video images of the content of the products according to the given order repeatedly. Note that, at step S14, with the end of display of the video images of the content of the products on the display 22, display of the story advertisement according to the given scenario may be started.

Effect

As described above, after the control device 20 according to the first embodiment detects a hand of a person in a first area that is set according to the position of a product and when the hand of the person is not detected in any one of the same area as the first area and a second area containing the first area and the product is not detected in a product detection area that is set according to the position, the control device 20 detects that the product is picked up. Accordingly, the control device 20 is able to detect that the product is picked up even when the position of the product is changed.

Furthermore, after the control device 20 according to the first embodiment detects a hand of a person in a first area that is set according to the position of a product and when the hand of the person is not detected in any one of the same area as the first area and a second area containing the first area and the product is not detected in a product detection area that is set according to the position, the control device 20, the control device 20 outputs a video image that is associated with the product. Accordingly, the control device 20 is able to detect that the product is picked up and output a video image associated with the picked-up product.

Furthermore, the control device 20 according to the first embodiment causes projection of a video image toward a product that is of the same type as that of the product and that is physically different from the product. Accordingly, a video image is projected to the product that is of the same type as that of the product and that is physically different from the product, which enables projection of the video image associated with the product such that the person easily recognizes the video image in association with the product.

Furthermore, the control device 20 according to the first embodiment causes an output of a video image representing the scent emitted by the product. Accordingly, the control device 20 enables the person to experience a simulated scent emitted by the first product from the video image.

Furthermore, the control device 20 according to the first embodiment causes an output of a video image representing a change of the scent emitted by the product over time. Accordingly, the control device 20 enables the person to experience a simulated change of the scent emitted by the product from the video image.

Furthermore, when the detection unit 52 detects that another product is picked up during the projection of the video image, the control device 20 according to the first embodiment causes an output of a video image associated with the picked-up another product. Accordingly, even when the picked-up product changes, the control device 20 enables prompt projection of the video image of the picked-up product.

Furthermore, the control device 20 according to the first embodiment detects a pickup by detecting a finger part. Accordingly, the control device 20 is able to accurately detect a pickup of a product.

Furthermore, the control device 20 according to the first embodiment detects the hand of the person by performing a skeleton analysis on an image of the person contained in a captured image. Accordingly, the control device 20 is able to detect a hand of a person accurately.

Furthermore, the control device 20 according to the first embodiment sets the first area, the second area, and the product detection area according to the position of the product that is detected from the captured image whose imaging area contains the position of the product. Accordingly, the control device 20 is able to appropriately set the first area, the second area, and the detection area even when the position of the product is changed.

[b] Second Embodiment

The first embodiment of the disclosed device has been described; however, the disclosed technology may be carried out in various different modes in addition to the above-described first embodiment. Other embodiments covered by the present invention will be described below.

With respect to the first embodiment, the case where the video image representing the scent of the product is emitted has been described; however, the disclosed device is not limited to this. For example, the control device 20 may output a video image representing the taste of the product, the feel of the product or a sound emitted by the product. Regarding the taste, it is possible to represent types of taste, such as sweetness, sourness, saltiness, bitterness, spiciness, and astringency, by using video images of foods representing the types of taste, respectively. For example, it is possible to visualize the fruitiness, such as sweetness, by representing the type and amount (number) of another fruit different from the product and improve ease of imaging the fruitiness from a visual effect. It is also possible to represent types of feel by using video images of things representing the types, respectively. For example, it is possible to represent coarseness as feel by using, for example, roughness of the surface of a thing. Furthermore, for example, it is possible to represent freshness as feel by using, for example, a waving water surface, a sense of speed of a falling waterdrop, the viscosity of the waterdrop, an amount of moisture of the waterdrop, or splash of the waterdrop. It is possible to represent a sound as a waveform by using audio effects. Furthermore, any ones of the scent of the product, the taste of the product, the feel of the product, and the sound emitted by the product may be represented by using video images.

With respect to the above-described first embodiment, the case where the products are perfumes have been described; however, the disclosed device is not limited to this. Any type of products may be used as long as the products differ in, for example, scent, taste, feel, or sound emitted by the product. For example, when the products are wines, their scents, tastes or feel may be represented by video images. When the products are cosmetics, such as emulsions, their feel may be represented by video images. When the products are vehicles or motorbikes, sounds emitted by them may be represented by video images. Representing the scents, tastes or feel of products by video images in this manner makes it possible to motivate customers to buy the products.

With respect to the above-described first embodiment, the case where the single tablet terminal 23 is provided has been described; however, the disclosed device is not limited to this. Multiple tablet terminals 23 may be provided. For example, when there are multiple product shelves 2, the tablet terminal 23 may be provided on each of the product shelves 2. Furthermore, the tablet terminal 23 may be set with respect to each of one or more products. With respect to the above-described first embodiment, the case where the single display 22 is provide has been described; however, the disclosed device is not limited to this. Multiple displays 22 may be provided.

With respect to the above-described first embodiment, the case where the perfumes 5 are provided with respect to the perfumes 3, respectively; however, the disclosed device is not limited to this. For example, only one perfume 5 may be provided and video images representing the scents of the respective perfumes 3 may be projected to the perfume 5. In other words, when a second behavior is detected with respect to any one of the perfumes 3A to 3D, a video image representing the scent of the detected perfume may be projected to the perfume 5A. In this case, the perfume 5 may have the same shape as any one of the perfumes 3 or may have a shape of a normal perfume bottle.

With respect to the above-described first embodiment, the case where displaying first information on the display 22 is ended once displaying second information on the tablet terminal 23 is started has been described; however, the disclosed device is not limited to this. For example, when displaying the second information on the tablet terminal 23 is started, the display 22 may be caused to display product information according to a given scenario.

With respect to the above-described first embodiment, the example where the display 22 and the tablet terminal 23 are devise different from one another has been represented; however, the disclosed device is not limited to this. Outputs to the first display exemplified as the display 22 and the second display exemplified as the tablet terminal 23 may be outputs to the same display device. In this case, a first display area corresponding to the first display and a second display area corresponding to the second display may be provided on the same display device.

The illustrated components of each device are functional ideas only and are not necessarily configured physically as illustrated in the drawings. In other words, a specific state of distribution and integration of each device are not limited to those illustrated in the drawings. All or part of the components may be distributed and integrated functionally or physically according to any unit and according to various loads and the state of use. For example, the setting unit 50, the identifying unit 51, the detection unit 52, the acquisition unit 53, and the display controller 54 may be integrated as appropriate. Furthermore, the process performed by each processor may be separated into processes performed by multiple processors as appropriate. Furthermore, all or part of the processing functions implemented by the respective processors may be implemented by using a CPU and a program that is analyzed and executed by the CPU or may be implemented as a hard wired logic.

Product Information Outputting Program

Figure 14:
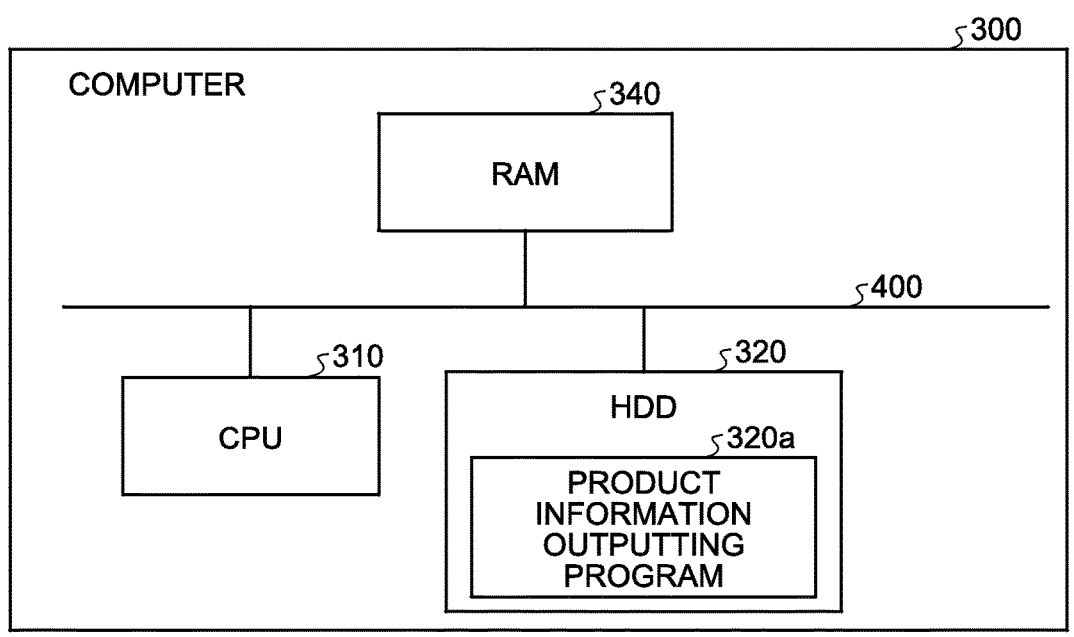
FIG. 14 is a diagram of a computer that executes a product information outputting program.

It is also possible to implement the various processes described with respect to the above-described embodiments by executing a program prepared in advance by using a computer system, such as a personal computer or a work station. An exemplary computer system that executes a program with the same functions as those of the above-described embodiments will be described below. FIG. 14 is a diagram of a computer that executes a product information outputting program.

As illustrated in FIG. 14, a computer 300 includes a central processing unit (CPU) 310, a hard disk drive (HDD) 320, and a random access memory (RAM) 340 that are connected via a bus 400.

A product information outputting program 320a that exerts the same functions as those of the setting unit 50, the identifying unit 51, the detection unit 52, the acquisition unit 53, and the display controller 54 is stored in advance in the HDD 320. The product information outputting program 320a may be separated as appropriate.

The HDD 320 stores various types of information. For example, the HDD 320 stores data of various types of content, such as video images and images used to promote products.

The CPU 310 reads the product information outputting program 320a from the HDD 320 and executes the product information outputting program 320a to implement the same operations as those of the respective processors of the embodiments. In other words, the product information outputting program 320a implements the same operations as those of the setting unit 50, the identifying unit 51, the detection unit 52, the acquisition unit 53, and the display controller 54.

The product information outputting program 320a is not necessarily stored in the HDD 320 from the beginning.

For example, the program is stored in "portable physical media", such as a flexible disk (FD), a CD-ROM, a DVD disk, a magneto-optical disk, and an IC card, each of which is inserted into the computer 300. The computer 300 may read the program from any one of the portable physical media and execute the program.

Furthermore, the program is stored in "other computers (or servers)" that are connected to the computer 300 via, for example, a public line, the Internet, a LAN, or a WAN. The computer 300 may read the program from any of the computers (servers) and execute the program.

According to an aspect of the present invention, it is possible to detect that a product is picked up.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A product information outputting method comprising:
   detecting, using a sensor device, that a hand of a person is present in a first area that is set according to a position of a product, the sensor device incorporating a camera, capturing an image with the camera at a given frame rate, and detecting a human body from the captured image, the first area surrounding the product with respect to the product; and
   when the hand of the person is not detected in any one of the first area and a second area and the product is not detected in a product detection area after presence of the hand was detected based on the detecting, determining that the product has been moved out of the product detection area, the second area containing the first area and being set by arranging third areas each having a predetermined size around the first area with respect to the product, the product detection area being set according to the position of the product and being detected from a captured image acquired by the sensor device based on product characteristics including at least color or shape.

2. The product information outputting method according to claim 1, wherein the hand of the person is a finger part.

3. The product information outputting method according to claim 1, wherein the detection of the hand of the person is achieved by performing a skeleton analysis on an image of the person contained in the captured image acquired by the sensor device whose imaging area contains the position of the product.

4. The product information outputting method according to claim 1, wherein the first area, the second area, and the product detection area are set according to the position of the product that is detected from the captured image that is acquired by the sensor device whose imaging area contains the position of the product.

5. A non-transitory computer-readable recording medium storing a product information outputting program that causes a computer to execute a process comprising:
   detecting, using a sensor device, that a hand of a person is present in a first area that is set according to a position of a product, the sensor device incorporating a camera, capturing an image with the camera at a given frame rate, and detecting a human body from the captured image, the first area surrounding the product with respect to the product; and when the hand of the person is not detected in any one of the first area and a second area and the product is not detected in a product detection area after presence of the hand was detected based on the detecting, determining that the product has been moved out of the product detection area, the second area containing the first area and being set by arranging third areas each having a predetermined size around the first area with respect to the product, the product detection area being set according to the position of the product and being detected from a captured image acquired by the sensor device based on product characteristics including at least color or shape.

6. A control device comprising:

a sensor device incorporating a camera, capturing an image with the camera at a given frame rate, and detecting a human body from the captured image;

a processor configured to:

detect using the sensor device, that a hand of a person is present in a first area that is set according to a position of a product, the first area surrounding the product with respect to the product; and when the hand of the person is not detected in any one of the first area and a second area and the product is not detected in a product detection area after presence of the hand was detected based on the detecting, determine that the product has been moved out of the product detection area, the second area containing the first area and being set by arranging third areas each having a predetermined size around the first area with respect to the product, the product detection area being set according to the position of the product and being detected from a captured image acquired by the sensor device based on product characteristics including at least color or shape.

* * * * *